July 19, 1932.  J. A. ARENZ  1,867,995
MACHINE FOR MILL CUTTING SINGLE POINT DOUBLE THREAD SCREWS
Filed Oct. 18, 1929  3 Sheets-Sheet 1
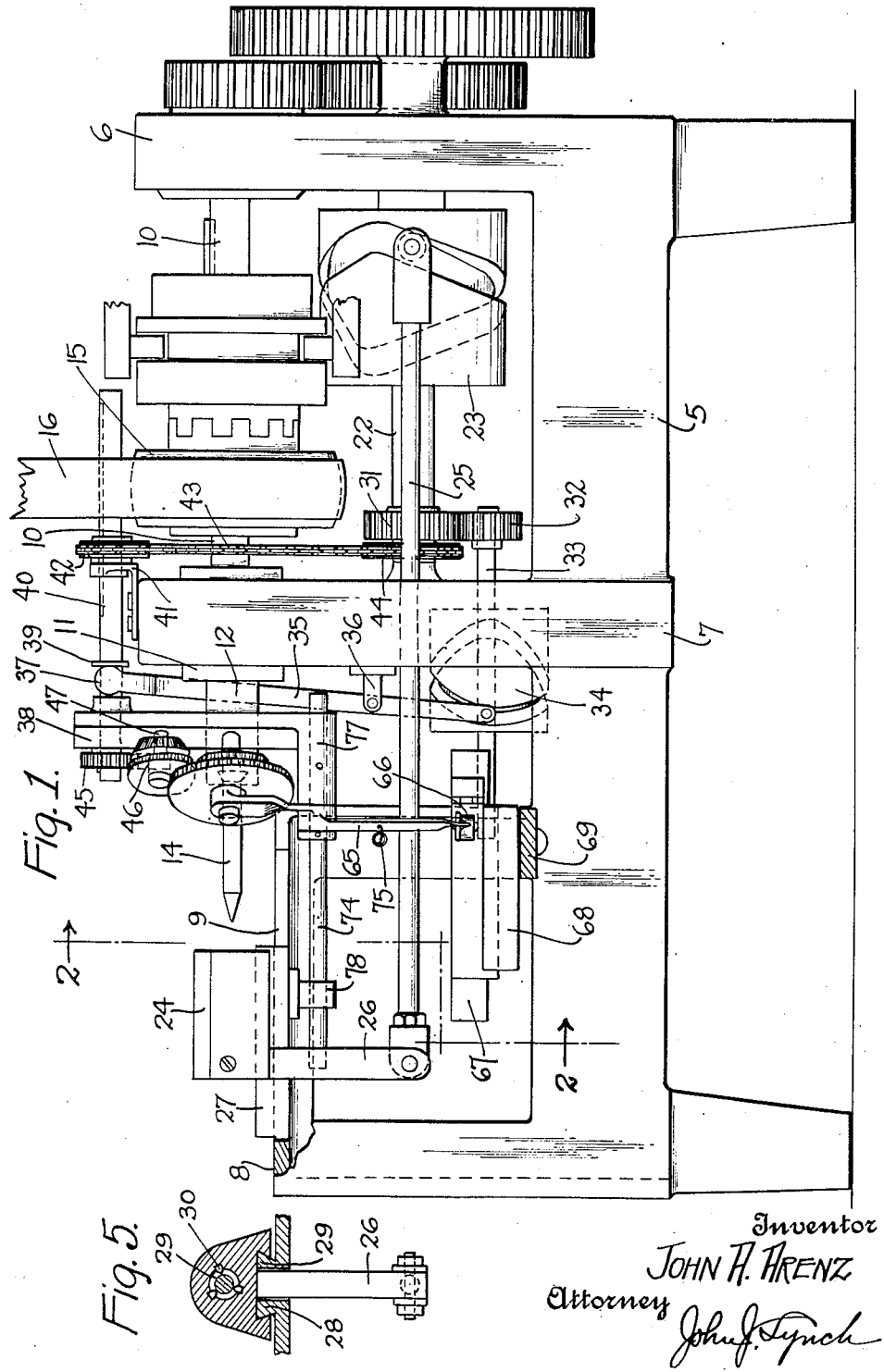
Inventor
JOHN A. ARENZ
Attorney July 19, 1932.  J. A. ARENZ  1,867,995
MACHINE FOR MILL CUTTING SINGLE POINT DOUBLE THREAD SCREWS
Filed Oct. 18, 1929   3 Sheets-Sheet 2

Inventor
JOHN A. ARENZ
By His Attorney
John J. Lynch

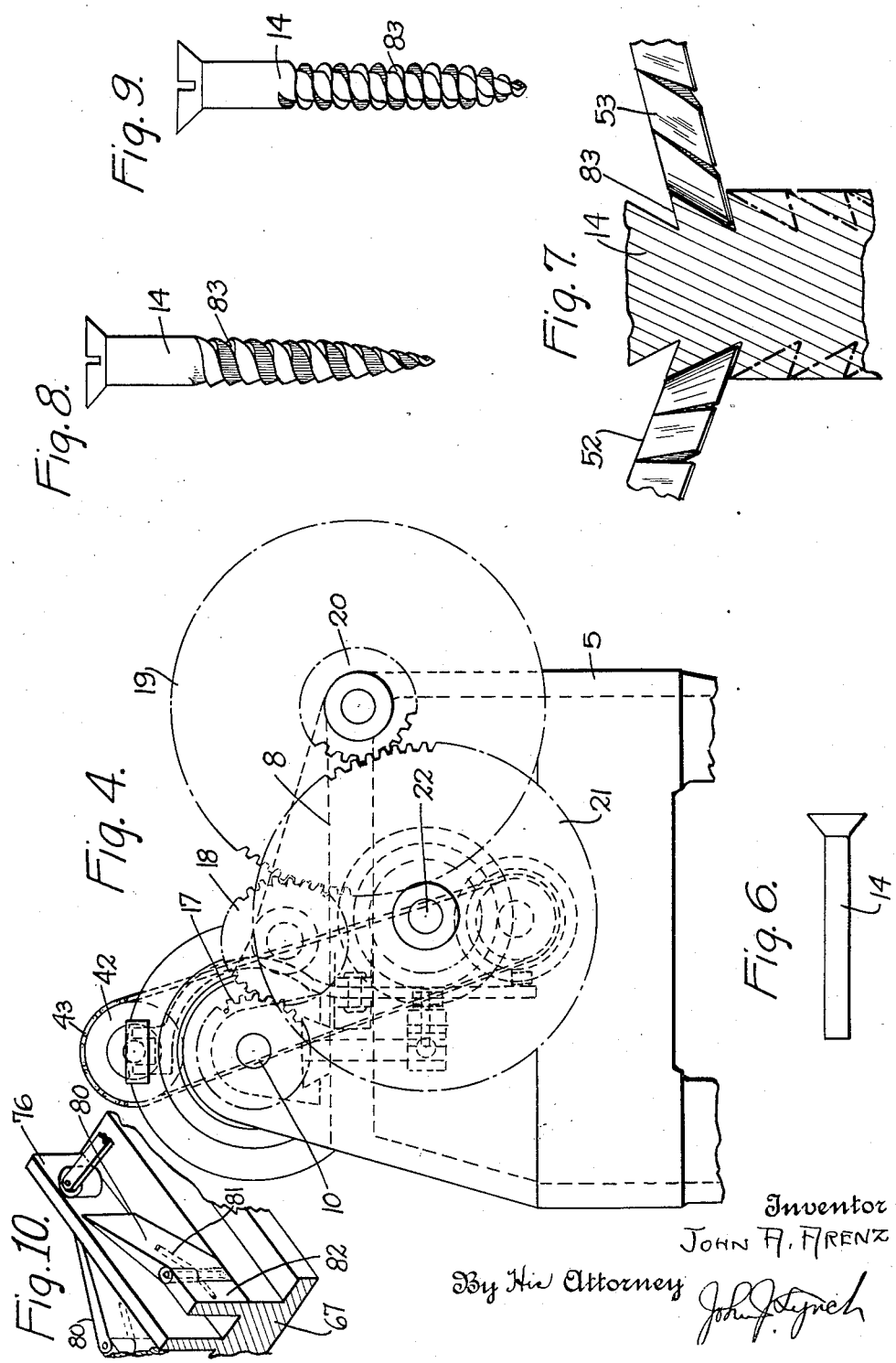

Patented July 19, 1932

1,867,995

UNITED STATES PATENT OFFICE

JOHN A. ARENZ, OF MOUNT VERNON, NEW YORK, ASSIGNOR TO INTERNATIONAL SCREW CO., OF WILMINGTON, DELAWARE, A CORPORATION OF DELAWARE

MACHINE FOR MILL CUTTING SINGLE POINT DOUBLE THREAD SCREWS

Application filed October 18, 1929, Serial No. 400,673, and in Canada April 18, 1929.

This invention relates to a machine for pointing and threading screws, the pointing and threading operations being performed in sequence and automatically, while a screw blank is held in a threading machine.

A primary object of my invention is the provision of a machine for cutting threads on a screw of the double thread, single point type through the use of screw thread filling cutters which are so located and so operated that they will cut adjacent threads of a double thread screw and terminate the threads at a single cutting point, providing on the ends of the screw, two cutting faces, the cutting operations taking place completely during the travel of the milling cutters in one movement of the same along the screw blank. It is my intention to point the blank before or during the threading operation and by reason of the fact that milling cutters are employed, the threading of the screw can be carried out effectively and very quickly and thus considerably reduce the cost of production.

While I am aware that various tools have been employed in the cutting of screw threads, the use of a machine for the cutting of a double thread terminating in a single point from a screw blank through the use of milling cutters which are operated in unison to carry out the threading operation, I believe to be new and it is to the means for mounting and operating these milling cutters that my invention is particularly directed, it being understood that when the milling cutters pass over the body of the screw once, the thread cutting operation is complete and the screw is dropped out of the machine and a new blank fed in which is pointed and threaded in approximately one-tenth the time that it now requires for cutting threads of this character.

Another equally important object of my invention is to provide a threading machine which is simple and efficient in operation and which is cheap to manufacture, which is composed of a minimum number of parts, thereby increasing the efficiency and operation which is greatly to be desired.

With the foregoing and other objects in view, which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

Figure 1 is a view in side elevation of an automatic screw threading machine to which my improvements have been applied.

Figure 4 is a view looking at the right hand end of the machine illustrated in Figure 1, this view being in elevation and illustrating the driving mechanism of the machine.

Figure 5 is a fragmentary section taken through the blank pointing head, illustrating particularly, its connection with an operating member.

Figure 6 is an illustration of a screw blank as handled in my improved machine.

Figure 7 is a greatly enlarged, fragmentary view in section taken through the screw blank and illustrates the action of the milling cutters in forming an undercut or barbed thread on the screw.

Figure 8 is a view illustrating one form of screw provided with a double thread and single point which is operated upon in my machine.

Figure 9 is a view similar to Figure 8 and shows a different form of screw thread which may be produced in the machine by changing the milling cutters, and Figure 10 is a fragmentary view in perspective of one end of the cam used in guiding the cutters in connection with the screw blank.

Figures 2, 3:
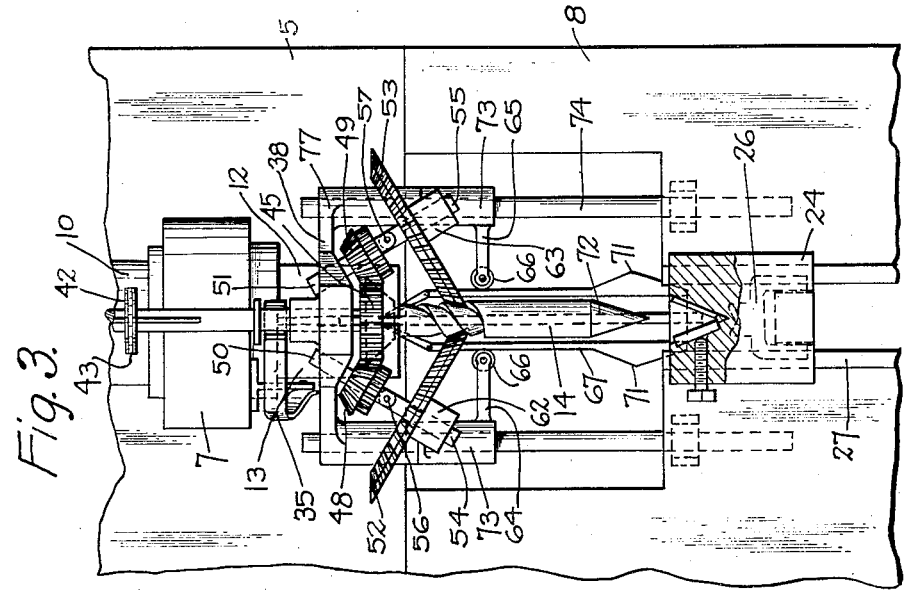
Figure 2 is a section taken on the line 2—2 of Figure 1 and illustrates the mounting of the milling cutters in their relation with a screw blank.
Figure 3 is a top plan view of the mechanism illustrated in Figure 2.

Referring to the drawings in which like reference characters refer to like parts, a machine frame 5 is illustrated which is cast to provide the upstanding bracket portions 6 and 7, one end of the machine being provided with a cable 8, with an opening 9 provided therein. Mounted in the upper portions of the brackets 6 and 7, is a drive shaft 10, having a mandrel 11 mounted thereon in any suitable manner with a gripping mechanism composed of a pair jaws 12 and 13 which are adapted to grip the screw blank 14 at the head thereof during the pointing and threading operation, the screw blank being fed to the gripping members 12 and 13 in a manner common to machines of this type, this feeding mechanism and advancing of the feeding mechanism forming no part of my present invention. A driving pulley 15 is mounted on the shaft 10 and is arranged to be operated in the usual manner by the belt 16 which is driven from any suitable source of power, the operation of the shaft 10 of course causing revolving movement of the gripping jaws 12 and 13 and consequently revolving movement of the screw blank during the threading and pointing operation.

As illustrated in Figure 4, the end of the shaft 10 is reduced and has secured thereto a gear 17 which, through the medium of the gear train comprising the gears 18, 19, 20 and 21, operates an auxiliary shaft 22. This shaft 22 carries a cam 23 which operates the blank pointing head 24 through the medium of the cam operated rod 25 which is secured at one of its ends to the lower end of the head extension 26. This extension extends from the under side of the pointing head 24 through a continuation of the opening 9 of the table or bed 8, this continuation being designated by the numeral 27 and having cast at its edges, integral with the table 8, as illustrated in Figure 5, the head guides 28 which are undercut and permit free sliding movement of the blank pointing head 24. This head 24 is provided with a central opening 29 in which is disposed, the blank pointing cutters 30. The cam 23 is so positioned that the pointing head 24 will move toward the end of the screw blank 14 as soon as the same has been properly positioned and will point the same as illustrated in Figures 1 and 3 after which it, of course, will move back to the position illustrated in Figure 1. The operation of this pointing head 24 may be carried out in unison with the threading operation, if desired, but it is preferable that it be done just in advance of the start of the threading operation in order that no interference to the threading operation can occur.

The particular manner and mechanism for carrying out the cutting of a double thread terminating in a single point on a screw blank, is the particular object of my invention and while I realize that other mechanisms may be employed for carrying out the same purpose, I do not wish to be understood as limiting myself to the precise construction illustrated. The shaft 22 is provided with a gear 31 which meshes with the pinion 32 carried on the cam shaft 33 and arranged to operate the latter, this shaft 33 being suitably journalled in the bracket 7 and table portion 8 of the machine and carrying intermediate its ends, the cam 34 which is arranged to impart an oscillatory movement to the upper end of the frame shaft arm 35 which is pivoted in a suitable bracket 36 secured to the bracket 7 of the machine. The bifurcated upper end 37 of the arm 35 is positioned between a cutter frame 38 and a collar 39 on a shaft 40 which is supported in any manner on the bracket 7 as by the journal bracket 41 secured to said bracket 7.

The shaft 40 has the sprocket wheel 42 which is connected through the medium of the sprocket chain 43 with a sprocket gear carried on the shaft 22. The shaft 40 through the medium of its blind connection with the gear 42 or sprocket wheel, can slide relatively thereto, this sliding movement of course, being effected by the lever 35 as hereinbefore described. The shaft 40 passes through the cutter frame 38 and carries at its outer end, the drive gear 45 which meshes with and drives a lower gear 46 carried on a stub shaft 47 carried in the cutter frame 38. The gear 46 drives the bevel gears 48 and 49 which are secured to and drive the angularly disposed shafts 50 and 51 respectively, these shafts at one end being journaled in the cutter frame 38. In order to provide for movement toward each other of the milling cutters 52 and 53 which are mounted upon their respective shafts 54 and 55, it is necessary to break the shafts 54 and 55 with universal joints 56 and 57 respectively, the shafts 54 and 55 being journaled in the frame 38 and carrying the gears 58 and 59 which mesh with and are driven by the gears 60 and 61 respectively carried on their respective shafts 50 and 51.

The cutters 52 and 53 which are of the milling type, as illustrated in Figure 7, are disposed at the proper angle to cut the pitch of thread desired, these cutters being secured to and revolved by their shafts 54 and 55. The three ends of the shafts 54 and 55 are journalled in the sleeves 62 and 63 to form the upper end of the cam rock levers 64 and 65 respectively to which are secured cam rollers 66 which are arranged to cooperate with the cam 67 which is slidably secured to the slotted face 68 supported on the cross piece 69 of the machine frame. Through the medium of the set screw 70, the cam 67 may be set at any desired position relatively to the screw blank, particular attention being directed to Figure 3 which illustrates the high point of the cam indicated by the numeral 71 in alignment with the tip end 72 of the screw blank 14. The purpose of the high point 71 of the cam being to throw the rollers 66 outwardly in order to rock the intermediate sleeve portion 73 of the cam arms 64 and 65 about the guide rods 74, in order to throw the cutters gradually toward the pointed end 72 of the screw blank 14 so that the screw thread will terminate at a single point on the blank and after passing of the rollers 66 over the high point 71 of the cam, the cutters recede until the rollers 66 ride over the end of the cam and through the medium of the spring 75, as illustrated in Figure 2, snap in against the center wall 76 of the cam at which time, the operation of the rock arm 35 has caused the retractile movement of the cutter frame 38 whose lower sleeved ends 77 are secured to the guide rods 74, which at their free end, pass through suitable bearings 78, the bearings being secured to the under side of the table or bed 8 of the machine. When the cam 34 has operated to retract the frame 38, the rollers of course will ride through the inner slots 79 of the cam 67 until they reach the gates 80 at the rear end of the cam, as illustrated in Figure 10 and pass through these gates through the medium of suitable springs 81 are normally maintained in contact with the centre wall or rib 76 of the cam. After these rollers have passed the gates 80 and the gates snap back to the position illustrated in Figure 10, the rollers of course, in their forward movement, will ride up on the gates 80 and back on to the outer surfaces 82 of the cam, this operation causing the bringing into contact with the screw blank of the cutters which will travel out toward the end of the screw blank, revolving at high speed and in the directions indicated by the arrows in Figure 2, while the screw blank 14, itself, is revolving and when the cutters approach the end of the blank, they will follow the contour of the pointed end of the screw by reason of the shape of the outer reach of the cam 67, as indicated by the numeral 71 and when the rollers 66 pass into the runways 79 of the cam, the cutters will be thrown entirely back out of the way of the blank which will be automatically dropped and a new blank will be fed in during the retraction of the cutters.

As soon as the new blank is in place, the operation of the cam 23 will bring on the pointing head 24 with the result that by the time the cutters 52 and 53 are again ready to operate, the pointing of the blank has been accomplished and the threading operation is automatically proceeded with, in this way, resulting in a great saving of time and entire automatic operation of the mechanism.

In Figure 7, I have illustrated the screw blank 14 and the cutters 52 and 53 to show how the cutters will provide an undercut or barbed thread, the undercut being indicated by the numeral 83 but it is understood, of course, that any type of thread, for instance, as that illustrated in connection with the screw shown in Figure 9, may be produced by simply changing the cutters, which may be accomplished at will and the pitch of the thread, the length of the thread and the depth of it, may be governed by the change of cutters and by change of the cam 67 which can be readily replaced by any suitable cam designed for particular kinds of screws.

In this way, the machine is adapted to handle any type of screws and any contour of thread and will automatically terminate a double threaded screw by providing thereon, a single point.

It will be readily understood that the pointing and threading of the screw blank is performed in one single operation, the pointing being performed first and the threading afterward at a single operation instead of in a plurality of operations as is now the practice and the production therefore, is very much faster than as at present accomplished, in threading a screw by the tracer method, which is the one commonly employed.

While I have illustrated and described my invention with some degree of particularity, I realize that in practice various alterations therein may be made without departing from the spirit of the invention or the scope of the appended claim.

What I claim is:—

In a screw pointing and threading machine, a work holder, means for revolving the holder, a cutter frame, a drive shaft in the cutter frame, guide rods in said cutter frame, means for revolving said drive shaft, a lever for reciprocating the shaft, the frame and the guide rods longitudinally, a cam for operating said lever, a plurality of rotary cutters, arms pivotally mounted on said guide rods and arranged to carry said cutters at the upper ends thereof, driving connections between the drive shaft and each of the cutters, said cutters being disposed at opposite sides of the work to be threaded, a fixed cam engaged by the lower ends of said arms and having a plurality of paths over which said ends travel during reciprocation of said frame to throw the cutters into and out of engagement with the work and gates in the fixed cam for shunting the lower ends of the arms on to some of said cam paths.

In testimony whereof, I have signed my name to this specification, this 17th day of October 1929.

JOHN A. ARENZ. [L. S.]